April 27, 1926.
J. F. DRILLING
DEHORNING DEVICE
Filed July 3, 1924
1,582,643
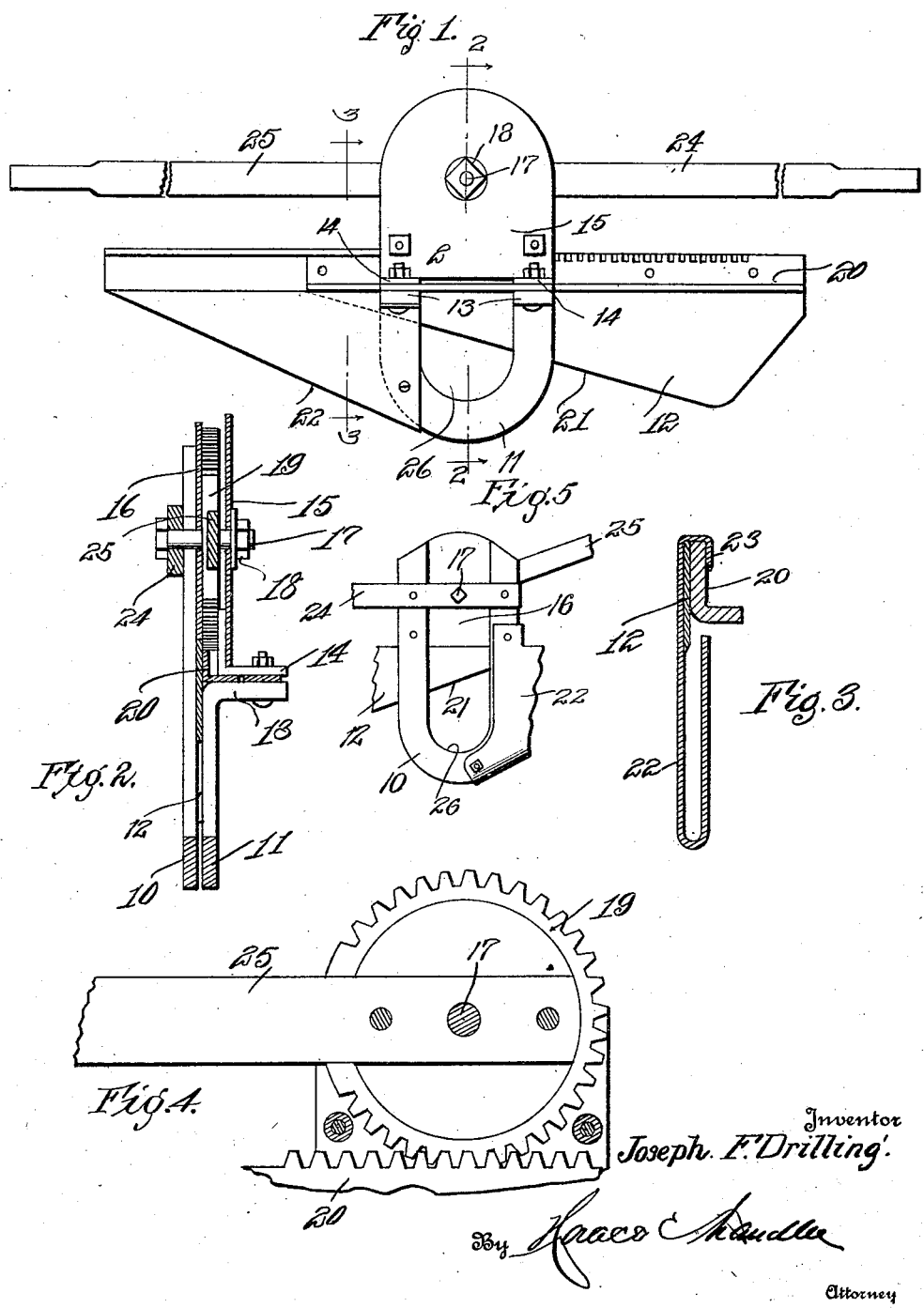
Inventor
Joseph F. Drilling.
By Horace Chandler
Attorney Patented Apr. 27, 1926.

1,582,643

UNITED STATES PATENT OFFICE.

JOSEPH F. DRILLING, OF STANTON, MINNESOTA.

DEHORNING DEVICE.

Application filed July 3, 1924. Serial No. 724,100.

*To all whom it may concern:*

Be it known that I, JOSEPH F. DRILLING, a citizen of the United States, residing at Stanton, in the county of Goodhue, State of Minnesota, have invented certain new and useful Improvements in Dehorning Devices; and I do hereby declare the following to be a full, clear, and exact description of the invention, such as will enable others skilled in the art to which it appertains to make and use the same.

This invention relates to dehorning devices. In devices of this character with which I am familiar, use is made of a stationary blade and a relatively movable blade, between which blades the horn is arranged to be severed when the movable blade is shifted in one direction, and the main objection to such devices is that they all have a tendency to crush the horn while it is being cut, and consequently can not be used to the best advantage.

It is therefore the purpose of the present invention to construct a device of the class in question, wherein a single cutting blade having an inclined cutting edge is arranged to slide through an apertured frame in which the horn is arranged, so that when the blade is moved in one direction, the horn is cleanly severed, the blade having a shearing action, which also facilitates the operation without in any way doing injury to the horn.

The nature and advantages of the invention will be better understood when the following detailed description is read in connection with the accompanying drawings, the invention residing in the construction, combination and arrangement of the parts as claimed.

In the drawings forming a part of this application, like numerals of reference indicate similar parts in the several views and wherein:

Figure 1 is a side elevation of the device showing the normal position of the parts.

Figure 2 is a sectional view taken on line 2—2 of Figure 1, the gear being shown in elevation.

Figure 3 is a sectional view taken on line 3—3 of Figure 1.

Figure 4 is an enlarged fragmentary detail view showing the arrangement between the gear and the rack bar.

Figure 5 is a fragmentary rear elevation of the device showing the manner of securing the arm 24.

The device forming the subject matter of the present invention embodies a two part frame, the respective parts being indicated at 10 and 11 respectively, and each possessing a substantially U-shaped contour. These parts are secured together but slightly spaced apart to permit the cutting blade 12 to pass between the said parts when the device is put into operation. The part 10 is considerably larger than the part 11, the latter terminating to provide right angularly disposed extremities 13 which are connected by an angle iron strip 14 clearly shown in Figure 1. Supported by this strip 14 is one of a pair of spaced walls indicated at 15, the other of said walls being shown at 16 and secured in any suitable manner to the part 10 of the frame. These walls 15 and 16 are connected by a bolt 17 passed centrally through said walls, which bolt has associated therewith a nut 18 as shown in Figure 2. Loosely mounted on this bolt and arranged between the walls 15 and 16 respectively is a gear 19 arranged directly above the rack bar 20 with which the gear meshes. This rack bar is of a substantially L-shaped formation in cross section and has its vertical branch arranged to slide between the walls 15 and 16, while its horizontal branch reposes upon the slide across the right angularly disposed extremities 13 of the part 11 of the frame. Carried by the rack bar is the blade 12 above mentioned, and it will be noted that the cutting edge 21 of this blade is inclined for a purpose to be hereinafter described. The blade normally projects from one side of the frame as shown at Figure 1, while projecting from the other side of the frame is a guard for the blade 12, and consequently shaped to correspond to the configuration of said blade. This guard is indicated at 22 and is of the cross sectional configuration illustrated in Figure 3, wherein it will be noted that the rear wall of the guard is considerably higher than the front walls thereof, and terminates to provide a channel-like portion 23 which receives the adjacent edge of the rack bar 20 when the latter is moved within the guard.

Secured to the part 10 of the frame and projecting laterally therefrom is a stationary lever 24, while secured to the gear 19 and pivotally mounted upon the bolt 17 is a movable lever 25. In the normal position of parts, the lever 25 is arranged in a line with the lever 24, with the rack bar 20 and the blade 12 in the position shown in Figure 1. When it is desired to use the device, the horn to be severed is received by the opening 26 of the frame, which, of course, is provided by the particular configuration of the respective parts 10 and 11 thereof. The lever 25 is then swung from the position shown in Figure 1 to a position along side and parallel with the stationary lever 24, during which movement of the lever 25 the gear wheel 19 is rotated, thereby moving the rack bar 20 and the blade 12 in a direction of the guard 22. As the blade is moved in this direction it traverses the opening 26, and thus severs the horn with a clean cut, and without in any way injuring the horn in the manner herein above outlined when the work is done with present day devices. In addition to making a smooth clean cut without injuring the horn, the construction of the invention is such as to render the operation convenient and permits the work to be done in comparatively short order.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What is claimed is:

A dehorning device including a frame comprising a pair of parallel spaced U-shaped members, an approximately triangular guard carried by one side of the frame and extending therefrom, a lever secured to the arms of one of the U-shaped members and extending thereacross and therebeyond, the upper ends of the other U-shaped member being extended at right angles away from the first U-shaped member, angle plates secured to and spaced from the said upper ends of the second U-shaped member, a cover plate secured to the first U-shaped member and disposed outwardly of the vertical portions of said angle plates, a pivot through the said cover plate and the said lever, a gear on the pivot between the plate and lever, an approximately triangular knife slidable between the U-shaped members and in said triangular guard, an angle plate carried by the knife and having one wing thereof slidable between the first-named angle plates and said outturned ends of the U-shaped member, the other wing of the last-named angle plate having teeth engaging said gear, and a lever secured to said gear.

In testimony whereof, I affix my signature.

JOSEPH F. DRILLING.